United States Patent
Li

(10) Patent No.: US 10,877,899 B2
(45) Date of Patent: *Dec. 29, 2020

(54) SYSTEM AND METHOD FOR DATA PROCESSING

(71) Applicant: ADVANCED NEW TECHNOLOGIES CO., LTD., Grand Cayman (KY)

(72) Inventor: Dongwei Li, Hangzhou (CN)

(73) Assignee: ADVANCED NEW TECHNOLOGIES CO., LTD., Grand Cayman (KY)

(*) Notice: Subject to any disclaimer, the term of this patent is extended or adjusted under 35 U.S.C. 154(b) by 0 days.

This patent is subject to a terminal disclaimer.

(21) Appl. No.: 16/893,201

(22) Filed: Jun. 4, 2020

(65) Prior Publication Data

US 2020/0301846 A1 Sep. 24, 2020

Related U.S. Application Data

(63) Continuation of application No. 16/715,151, filed on Dec. 16, 2019, now Pat. No. 10,713,176, which is a
(Continued)

(51) Int. Cl.
*G06F 9/455* (2018.01)
*G06F 12/10* (2016.01)

(52) U.S. Cl.
CPC .......... *G06F 12/10* (2013.01); *G06F 9/45533* (2013.01); *G06F 2212/152* (2013.01)

(58) Field of Classification Search
CPC .............. G06F 12/10; G06F 9/45533
(Continued)

(56) References Cited

U.S. PATENT DOCUMENTS 8,984,446 B1 3/2015 Meketa et al.
2014/0115585 A1* 4/2014 Hrischuk .............. G06F 9/5016
718/1
(Continued)

FOREIGN PATENT DOCUMENTS

CN 102193829 A 9/2011
CN 104216726 A 12/2014
JP H10126278 A 5/1998

OTHER PUBLICATIONS

U.S. Appl. No. 16/715,151, Jun. 2019, Li.*
(Continued)

*Primary Examiner* — John Q Chavis

(57) ABSTRACT

Methods, systems, and apparatus, including computer programs encoded on computer storage media, for data processing are provided. One of the methods includes: obtaining a bytecode compiled from source code comprising one or more input parameters, the source code including an encoding function to encode the one or more input parameters, save the encoded one or more input parameters in a memory segment, and provide a memory location of the memory segment; executing, according to the bytecode, the encoding function to encode the one or more input parameters to obtain the memory location of the memory segment storing the encoded one or more input parameters; and providing the memory location to a function for retrieving and decoding the encoded one or more input parameters to obtain the one or more input parameters.

20 Claims, 8 Drawing Sheets

Related U.S. Application Data continuation of application No. PCT/CN2019/093615, filed on Jun. 28, 2019.

(58) Field of Classification Search
USPC .......................................................... 717/154
See application file for complete search history.

(56) References Cited

U.S. PATENT DOCUMENTS

| | | |
|---|---|---|
| 2014/0380313 A1 | 12/2014 | Chen et al. |
| 2017/0345011 A1 | 11/2017 | Salami et al. |
| 2017/0352012 A1 | 12/2017 | Hearn et al. |
| 2018/0039667 A1 | 2/2018 | Pierce et al. |
| 2018/0082256 A1 | 3/2018 | Tummuru et al. |
| 2018/0089761 A1 | 3/2018 | Stradling et al. |
| 2018/0131743 A1 | 5/2018 | Gorin et al. |
| 2018/0143995 A1 | 5/2018 | Bailey et al. |
| 2018/0174255 A1 | 6/2018 | Hunn et al. |
| 2018/0227116 A1 | 8/2018 | Chapman et al. |
| 2018/0232693 A1 | 8/2018 | Gillen et al. |
| 2018/0247191 A1 | 8/2018 | Katz et al. |
| 2018/0331835 A1 | 11/2018 | Jackson |
| 2018/0349621 A1 | 12/2018 | Schvey et al. |
| 2018/0349706 A1 | 12/2018 | Hodgson et al. |
| 2019/0087793 A1 | 3/2019 | Dickerson et al. |
| 2019/0130399 A1* | 5/2019 | Wright ................ G06Q 20/3678 |
| 2019/0156440 A1* | 5/2019 | Wang ..................... H04L 9/0637 |
| 2019/0164153 A1 | 5/2019 | Agrawal et al. |
| 2019/0188653 A1 | 6/2019 | Khaund |
| 2019/0197622 A1 | 6/2019 | Molinari et al. |

OTHER PUBLICATIONS

International Search Report and Written Opinion for Application No. PCT/CN2019/093615, dated Mar. 27, 2020.
Zhang, "Lua Design and Implementation—Virtual Machine", Apr. 10, 2019.
Search Report for European Application No. 19 764 440.4 dated Sep. 23, 2020.
Dan Ruta, "Passing and returning WebAssembly array paramenters: Becoming Human: Artificial Intelligence Magazine," Sep. 28, 2017, https://becominghuman.ai/passing-and-returning-webassembly-array-parameters-a0f572c65d97.
Bryan Hughes, "Passing structured data between C++ and JavaScript in Web Assembly—DEV", Apr. 22, 2019, https://dev.to/azure/passing-structured-data-from-c-to-javascript-in-web-assembly-1i0p.

* cited by examiner

510

511: obtaining a bytecode compiled from source code comprising one or more input parameters, the source code including an encoding function to encode the one or more input parameters, save the encoded one or more input parameters in a memory segment, and provide a memory location of the memory segment

512: executing, according to the bytecode, the encoding function to encode the one or more input parameters to obtain the memory location of the memory segment storing the encoded one or more input parameters

513: providing the memory location to a function for retrieving and decoding the encoded one or more input parameters to obtain the one or more input parameters

FIG. 5

SYSTEM AND METHOD FOR DATA PROCESSING

CROSS REFERENCE TO RELATED APPLICATION

The present application is a continuation application of U.S. patent application Ser. No. 16/715,151, filed on Dec. 16, 2019, and entitled "SYSTEM AND METHOD FOR DATA PROCESSING," which is a continuation application of International Patent Application No. PCT/CN2019/093615, filed on Jun. 28, 2019, and entitled "SYSTEM AND METHOD FOR DATA PROCESSING." The entire contents of all of the above-identified applications are incorporated herein by reference.

TECHNICAL FIELD

This application generally relates to methods and devices for data processing.

BACKGROUND

Blockchain provides data storage in a decentralized fashion, by having a network of nodes maintain and update the chain of blocks. Blockchain and other various computing operations require data transmission and processing among compilers, virtual machines (VMs), and other devices. A VM is a software emulation of a computer system based on computer architectures that provides functionality of a physical computer, and in the blockchain context, can be understood as a system designed to operate as a runtime environment for blockchain functions, such as blockchain contracts (also called smart contracts). When a user wants to perform an operation (e.g., deploying a smart contract, retrieving a state of the blockchain) to the blockchain, the user may program instructions on a client device in a high-level language source code and compile them with a corresponding compiler to produce a bytecode. The instructions may comprise functions that accept input parameters and generate output parameters. The bytecode may be passed to and executed by the VM to effectuate the operation.

In current solutions, several factors may prevent the VM from correctly initiating, obtaining, or performing operations to the parameters. For example, one or more input parameters may have complicated data structures such as pointer type variables. Each of the pointer type variables may store an address of another variable (e.g., an integer type variable, a Boolean type variable, a string type variable), at which the value of the another variable is stored. When the input parameters are compiled, the addresses stored in the pointer type variables may be shifted and become address shifts. If the complexity of the data structure of the parameters increases (e.g., as in a double pointer type parameter, as in multiple nested parameters with complex data structures), the shifts may become too strenuous to reverse, which prevents correct passing of the parameters into and out from the functions and hinders normal operation of the system. For another example, the VM and the compiler may have distinct word sizes. VMs are commonly found to be 32 bits, while the compilers and processors of client devices run at 64 bits. Such incompatibility may further cause confusion in memory address assignment and contribute to erroneous operations at the VMs.

SUMMARY

Various embodiments of the specification include, but are not limited to, systems, methods, and non-transitory computer readable media for data processing.

According to some embodiments, a computer-implemented method for data processing comprises: obtaining a bytecode compiled from source code comprising one or more input parameters, the source code including an encoding function to encode the one or more input parameters, save the encoded one or more input parameters in a memory segment, and provide a memory location of the memory segment; executing, according to the bytecode, the encoding function to encode the one or more input parameters to obtain the memory location of the memory segment storing the encoded one or more input parameters; and providing the memory location to a function for retrieving and decoding the encoded one or more input parameters to obtain the one or more input parameters.

According to other embodiments, the function is a user-defined function.

According to still other embodiments, at least one of the one or more input parameters comprises a pointer type variable.

According to yet other embodiments, the pointer type variable comprises a multiple indirection type variable.

According to some embodiments, the memory location of the memory segment comprises a pointer corresponding to a starting or ending address of the memory segment and a data length corresponding to the memory segment.

According to other embodiments, the memory location of the memory segment comprises a first pointer corresponding to a starting address of the memory segment and a second pointer corresponding to an ending address of the memory segment.

According to still other embodiments, the method is performed by a virtual machine; and obtaining the bytecode compiled from the source code comprising the one or more input parameters comprises: obtaining, from a computing device, the bytecode compiled by a compiler associated with the computing device from the source code comprising the one or more input parameters.

According to yet other embodiments, the memory location comprises a pointer storing an address corresponding to the memory segment; and the address is shifted by compilation in the bytecode compiled from the source code.

According to some embodiments, the method further comprises executing the function. Executing the function comprises: restoring the shifted address according to a storage starting location of the virtual machine and an address shift obtained by the virtual machine; retrieving the encoded one or more input parameters according to the restored address; and decoding the encoded one or more input parameters to retrieve the one or more input parameters.

According to other embodiments, executing the function further comprises: invoking another function based on the one or more input parameters to return one or more output parameters; and encoding the one or more output parameters.

According to some embodiments, invoking the another function based on the one or more input parameters to return the one or more output parameters comprises: invoking the another function to return a state of a blockchain.

According to other embodiments, the method further comprises decoding the one or more output parameters outside the function.

According to still other embodiments, the virtual machine and the compiler have different word sizes.

According to yet other embodiments, the virtual machine is based on a WebAssembly (WASM) format.

According to some embodiments, a system for data processing comprises: one or more processors; and one or more computer-readable memories coupled to the one or more processors and having instructions stored thereon that are executable by the one or more processors to perform the method of any of the preceding embodiments.

According to other embodiments, an apparatus for executing blockchain contracts comprises a plurality of modules for performing the method of any of the preceding embodiments.

According to still other embodiments, a non-transitory computer-readable medium has stored therein instructions that, when executed by a processor of a device, cause the device to perform the method of any of the preceding embodiments.

According to some embodiments, a system for data processing comprises one or more processors and one or more non-transitory computer-readable memories coupled to the one or more processors and configured with instructions executable by the one or more processors to cause the system to perform operations comprising: obtaining a bytecode compiled from source code comprising one or more input parameters, the source code including an encoding function to encode the one or more input parameters, save the encoded one or more input parameters in a memory segment, and provide a memory location of the memory segment; executing, according to the bytecode, the encoding function to encode the one or more input parameters to obtain the memory location of the memory segment storing the encoded one or more input parameters; and providing the memory location to a function for retrieving and decoding the encoded one or more input parameters to obtain the one or more input parameters.

According to other embodiments, a non-transitory computer-readable storage medium for data processing is configured with instructions executable by one or more processors to cause the one or more processors to perform operations comprising: obtaining a bytecode compiled from source code comprising one or more input parameters, the source code including an encoding function to encode the one or more input parameters, save the encoded one or more input parameters in a memory segment, and provide a memory location of the memory segment; executing, according to the bytecode, the encoding function to encode the one or more input parameters to obtain the memory location of the memory segment storing the encoded one or more input parameters; and providing the memory location to a function for retrieving and decoding the encoded one or more input parameters to obtain the one or more input parameters.

According to still other embodiments, an apparatus for data processing comprises an obtaining module for obtaining a bytecode compiled from source code comprising one or more input parameters, the source code including an encoding function to encode the one or more input parameters, save the encoded one or more input parameters in a memory segment, and provide a memory location of the memory segment; an executing module for executing, according to the bytecode, the encoding function to encode the one or more input parameters to obtain the memory location of the memory segment storing the encoded one or more input parameters; and a providing module for providing the memory location to a function for retrieving and decoding the encoded one or more input parameters to obtain the one or more input parameters.

Embodiments disclosed in the specification have one or more technical effects. In some embodiments, by an encoding process, one or more input parameters for providing to a function (e.g., a user-defined function for execution on a virtual machine) can be correctly passed to the virtual machine, and similarly one or more output parameters of the function can be correctly returned from the function. In one example, the function is user-defined and therefore has to independently counter the effects of shifts caused by compilation and different word sizes between the compiler and the virtual machine. In some embodiments, some or all of the input and output parameters may be encoded, individually or collectively, into a data stream saved to a memory segment represented by a memory location to reduce the complexity of the data structure of the parameters. In one embodiment, the memory location may comprise a pointer storing a starting or ending address of the memory segment and a data length across the memory segment. In another embodiment, the memory location may comprise a first pointer storing a starting address of the memory segment and a second pointer storing an ending address of the memory segment. In some embodiments, according to a bytecode compiled by the compiler, the virtual machine may encode the input parameters and trigger the function to decode the input parameters for various operations (e.g., generating the one or more output parameters). In some embodiments, similarly, the one or more output parameters may be encoded before exiting the function to return encoded output parameters from the function for decoding and other operations. The virtual machine may encode the output parameters into another data stream saved to another memory segment represented by another memory location and return the another memory location from the function. In some embodiments, the encoding step enables the virtual machine to correctly locate the memory location for retrieval or storage of the input and/or output parameters. In some embodiments, with the disclosed methods, blockchain operations based on virtual machine execution can be smoothly carried out without encountering erroneous parameters. In one embodiment, the function may comprise a customized operation calling a state of the blockchain based on one or more input parameters associated with a blockchain and optionally return another state of the blockchain. The function can be executed correctly to effectuate a corresponding user operation.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as limiting.

BRIEF DESCRIPTION OF THE DRAWINGS

FIG. 5 illustrates a flowchart of a method for data processing, in accordance with some embodiments.

DETAILED DESCRIPTION

The various systems, devices, and methods for data processing described herein can be applied in many environments, such as blockchain networks. Although the description herein focuses on the application in exemplary blockchain networks, a person of ordinary skill in the art would understand that the specification is not limited to such application. The disclosed systems, devices, and methods may also be applicable for various other instances that involve source code compilation for virtual machine (VM) execution. The disclosed systems, devices, and methods may still apply, if the various nodes described herein are correspondingly replaced by other types of computing devices.

Figure 1:
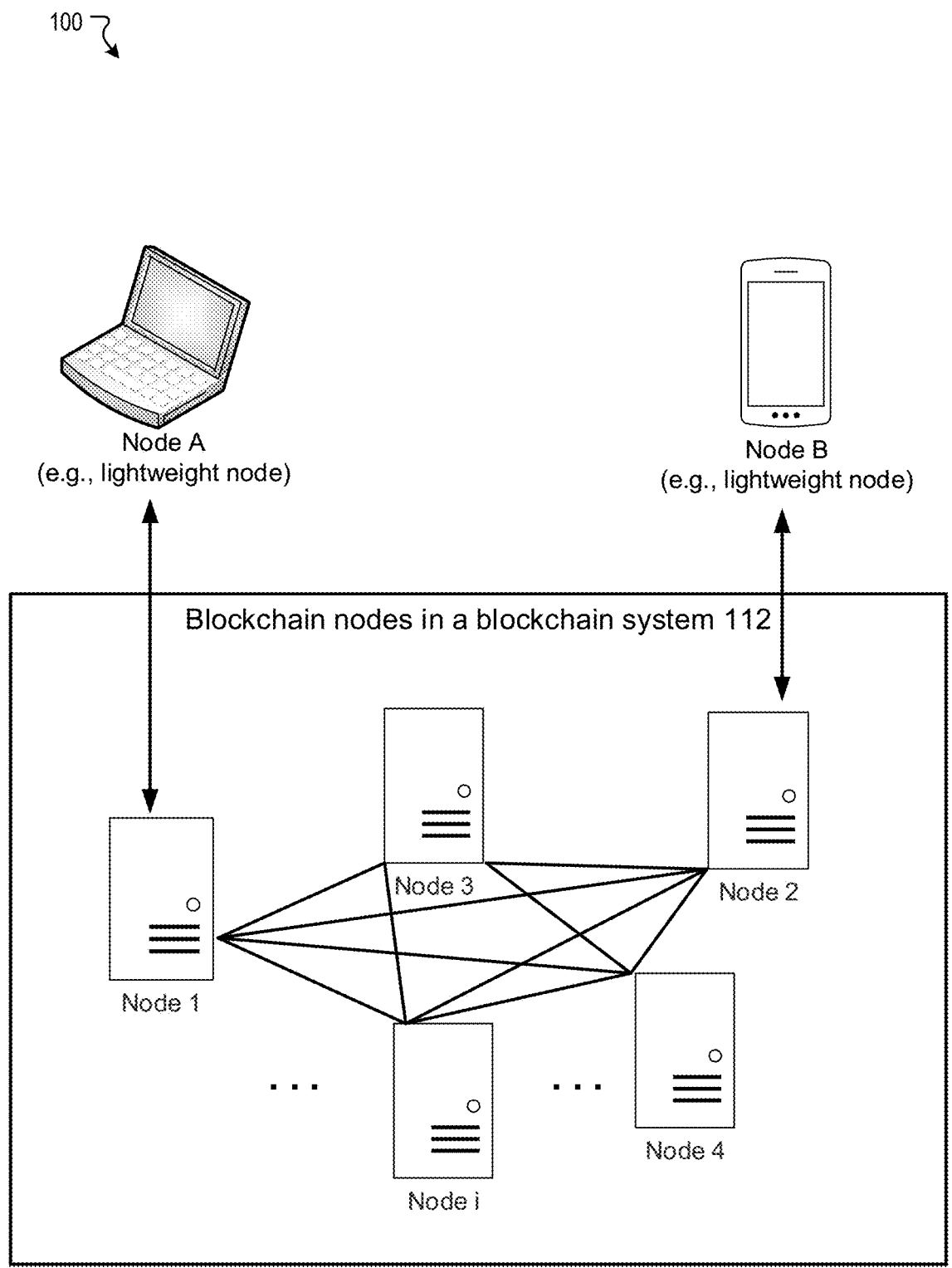
FIG. 1 illustrates a system for data processing, in accordance with some embodiments.

FIG. 1 shows an example of a blockchain network 100, in accordance with some embodiments. The blockchain network 100 may be an exemplary system for data processing. In some embodiments, the disclosed methods may help correctly passing parameters between the client device (e.g., Node A, Node B) and the blockchain node (e.g., Node 1, Node 2) and ensure proper system operations (e.g., deploying or calling blockchain contracts, processing blockchain transactions, etc.) without encountering erroneous parameters.

As shown, the blockchain network 100 may comprise one or more client devices (e.g., Node A, Node B, etc.) coupled to a blockchain system 112. The client devices may comprise, for example, computers, mobile phones, or other computing devices. The client devices may include lightweight nodes. A lightweight node may not download the complete blockchain, but may instead just download the block headers to validate the authenticity of the blockchain transactions. Lightweight nodes may be served by and effectively dependent on full nodes (e.g., those in the blockchain system 112) to access more functions of the blockchain. The lightweight nodes may be implemented in electronic devices such as laptops, mobile phones, and the like by installing an appropriate software.

The blockchain system 112 may comprise a plurality of blockchain nodes (e.g., Node 1, Node 2, Node 3, Node 4, Node i, etc.), which may include full nodes. Full nodes may download every block and blockchain transaction and check them against the blockchain's consensus rules. The blockchain nodes may form a network (e.g., peer-to-peer network) with one blockchain node communicating with another. The order and the number of the blockchain nodes as shown are merely examples and for the simplicity of illustration. The blockchain nodes may be implemented in servers, computers, etc. For example, the blockchain nodes may be implemented in a cluster of servers. The cluster of servers may employ load balancing. Each blockchain node may correspond to one or more physical hardware devices or virtual devices coupled together via various types of communication methods such as TCP/IP. Depending on the classifications, the blockchain nodes may also be referred to as full nodes, Geth nodes, consensus nodes, etc.

Each of the client devices and blockchain nodes may be installed with appropriate software (e.g., application program interface) and/or hardware (e.g., wires, wireless connections) to access other devices of the blockchain network 100. In general, the client devices and blockchain nodes may be able to communicate with one another through one or more wired or wireless networks (e.g., the Internet) through which data can be communicated. Each of the client devices and blockchain nodes may include one or more processors and one or more memories coupled to the one or more processors. The memories may be non-transitory and computer-readable and be configured with instructions executable by one or more processors to cause the one or more processors to perform operations described herein. The instructions may be stored in the memories or downloaded over a communications network without necessarily being stored in the memories. Although the client devices and blockchain nodes are shown as separate components in this figure, it will be appreciated that these systems and devices can be implemented as single devices or multiple devices coupled together. That is, a client device (e.g., Node A) may be alternatively integrated into a blockchain node (e.g., Node 1).

The client devices such as Node A and Node B may be installed with an appropriate blockchain software to initiate, forward, or access blockchain transactions. Node A may access the blockchain through communications with Node 1 or one or more other blockchain nodes, and Node B may access the blockchain through communications with Node 2 or one or more other blockchain nodes. Node A may submit a blockchain transaction to the blockchain through Node 1 or similar nodes to request adding the blockchain transaction to the blockchain. The submitted blockchain transaction may comprise a blockchain contract (e.g., smart contract) for deployment on the blockchain. In some embodiments, the term "blockchain transaction" (or "transaction" for short) may be implemented via a blockchain system and recorded to the blockchain. The blockchain transaction may include, for example, a financial transaction, a blockchain contract transaction for deploying or invoking a blockchain contract, a blockchain transaction that updates a state (e.g., world state) of the blockchain, etc. The blockchain transaction does not have to involve a financial exchange.

The blockchain may be maintained by the blockchain nodes each comprising or coupling to a memory. In some embodiments, the memory may store a pool database. The pool database may be accessible to the plurality of blockchain nodes in a distributed manner. For example, the pool database may be respectively stored in the memories of the blockchain nodes. The pool database may store a plurality of blockchain transactions submitted by the one or more client devices similar to Node A.

In some embodiments, after receiving a blockchain transaction request of an unconfirmed blockchain transaction, the recipient blockchain node may perform some preliminary verification of the blockchain transaction. For example, Node 1 may perform the preliminary verification after receiving the blockchain transaction from Node A. Once verified, the blockchain transaction may be stored in the pool database of the recipient blockchain node (e.g., Node 1), which may also forward the blockchain transaction to one or more other blockchain nodes (e.g., Node 3, Node 4). The one or more other blockchain nodes may repeat the process done by the recipient node.

Once the blockchain transactions in the corresponding pool database reach a certain level (e.g., a threshold amount), the blockchain nodes may each verify the batch of blockchain transactions in the corresponding pool database according to consensus rules or other rules. If the blockchain transaction involves a blockchain contract (e.g., smart contract), the blockchain node may execute the blockchain contract locally. The blockchain contract may include user-written contract code. For example, a blockchain transaction may encode data in contract code for data storage (by contract deployment) or retrieval (by invoking a deployed contract).

A certain blockchain node that successfully verifies its batch of blockchain transactions in accordance with consensus rules may pack the blockchain transactions into its local copy of the blockchain and multicast the results to other blockchain nodes. The certain blockchain node may be a blockchain node that has first successfully completed the verification, that has obtained the verification privilege, or that has been determined based on another consensus rule, etc. Then, the other blockchain nodes may execute the blockchain transactions locally, verify the execution results with one another (e.g., by performing hash calculations), and synchronize their copies of the blockchain with that of the certain blockchain node. By updating their local copies of the blockchain, the other blockchain nodes may similarly write such information in the blockchain transaction into respective local memories. As such, the blockchain contract can be deployed on the blockchain. If the verification fails at some point, the blockchain transaction is rejected.

The deployed blockchain contract may have an address, according to which the deployed contract can be accessed. A blockchain node may invoke the deployed blockchain contract by inputting certain parameters to the blockchain contract. In one embodiment, Node B may request to invoke the deployed blockchain contract to perform various operations. For example, data stored in the deployed blockchain contract may be retrieved. For another example, data may be added to the deployed blockchain contract. For yet another example, a financial transaction specified in the deployed blockchain contract may be executed. Notwithstanding the above, other types of blockchain systems and associated consensus rules may be applied to the disclosed blockchain system. An example of deploying and calling a blockchain contract is provided below with respect to FIG. 2A and FIG. 2B, in which the disclosed data processing methods may be applied.

Figure 2A:
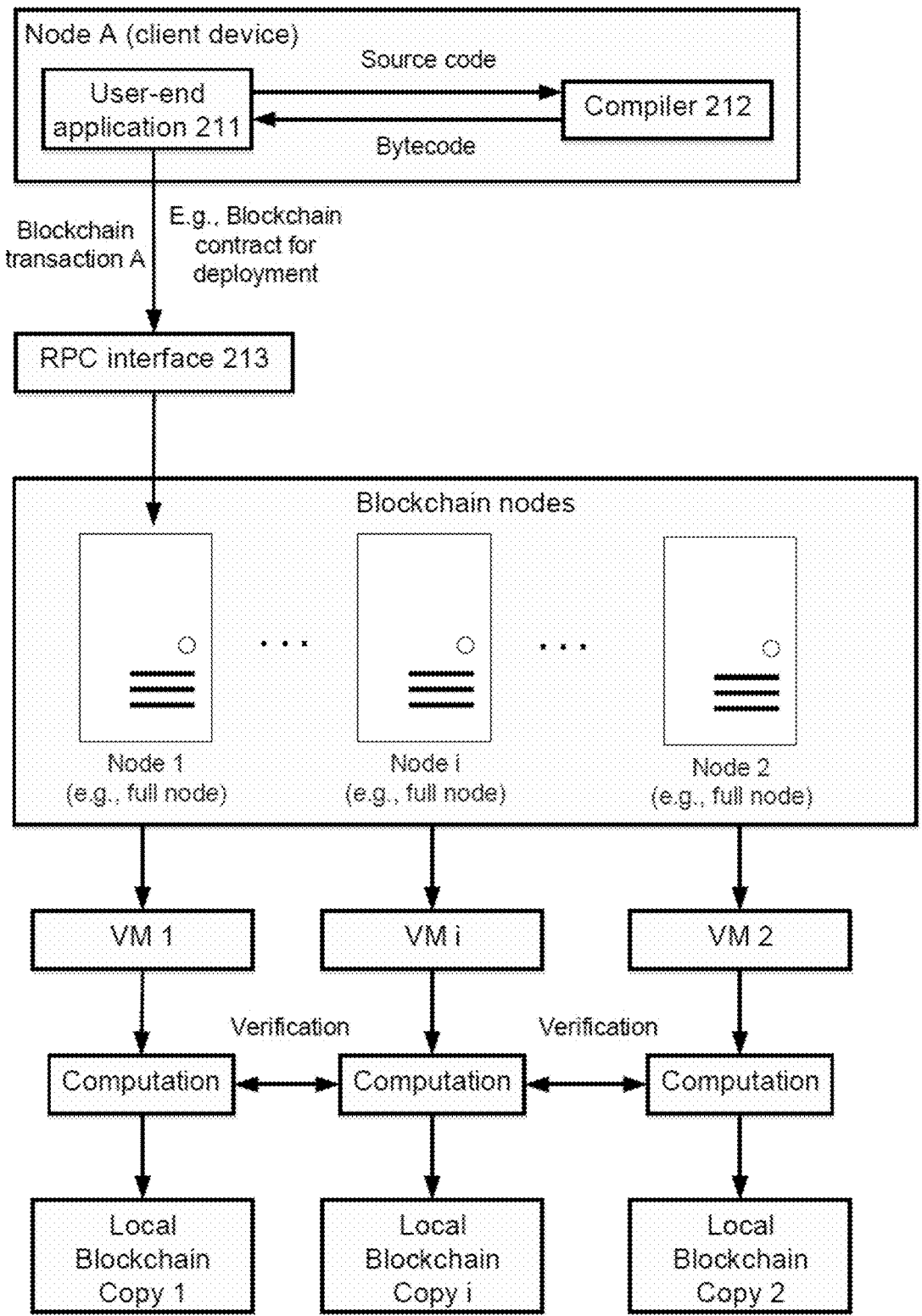
FIG. 2A and FIG. 2B illustrate a framework for data processing, in accordance with some embodiments.
Figure 2B:
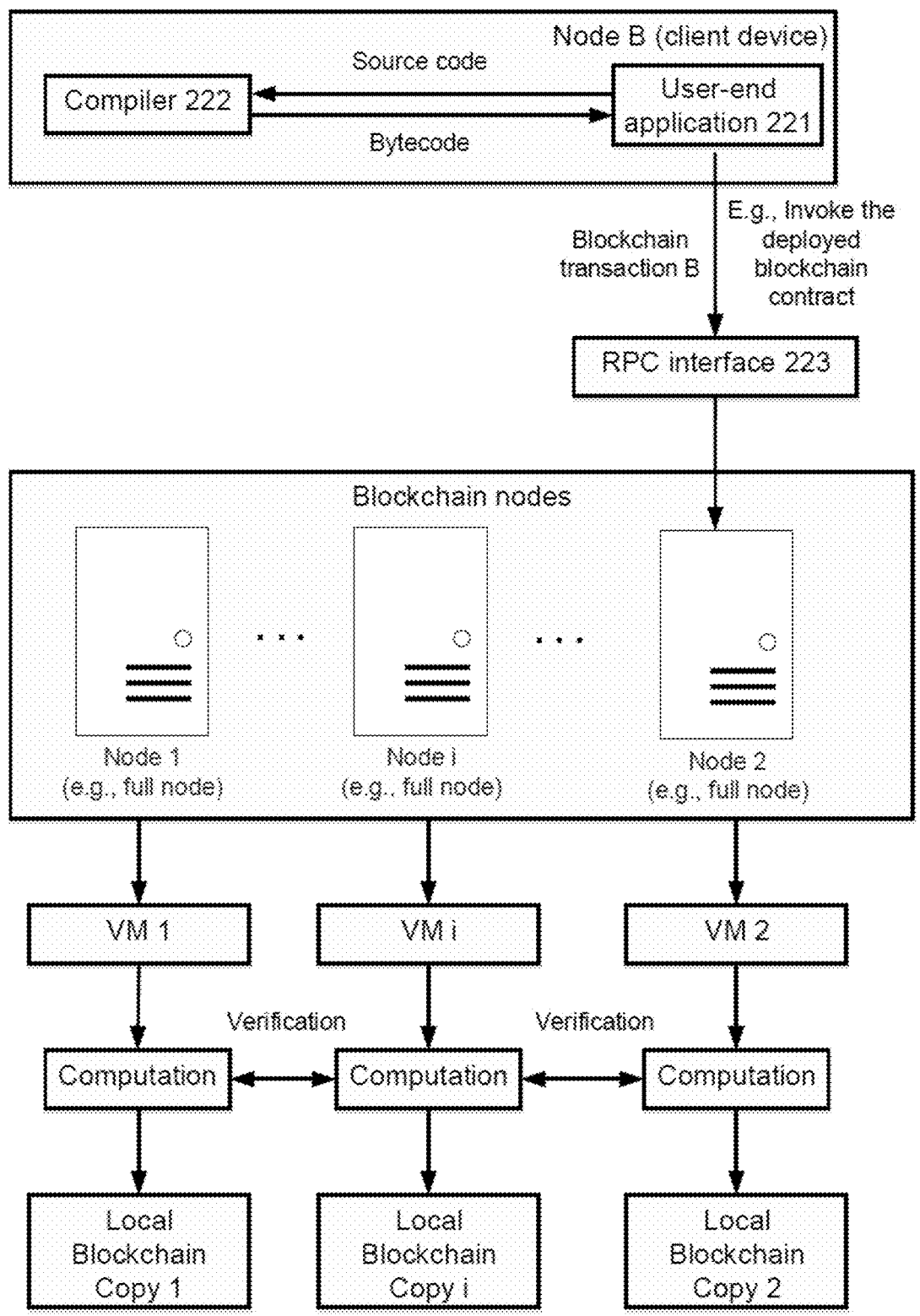

FIG. 2A and FIG. 2B illustrate a framework for data processing in the context of blockchain operations, in accordance with some embodiments. In some embodiments, the disclosed methods may help correctly passing parameters between the client device (e.g., Node A, Node B) and the virtual machine (e.g., Node 1's local VM 1, Node 2's local VM 2) and ensure proper system operations (e.g., deploying or calling blockchain contracts, processing blockchain transactions, etc.) without encountering erroneous parameters. Although the blockchain is used as an example for the application of the disclosed methods, the disclosed methods can be used in various other applications.

FIG. 2A shows deploying a blockchain contract, in accordance with some embodiments. In some embodiments, a blockchain contract may start with its construction in source code. For example, a user A may program a blockchain contract in source code and input the source code to an interface of a user-end application 211 (e.g., a programming interface). In this figure, the user-end application 211 is installed in Node A. The source code may be written in a high-level programming language. To deploy the blockchain contract, Node A may compile the blockchain contract source code using a corresponding compiler 212 (e.g., a compiler that is compatible with the high-level programming language), which converts the source code into bytecode. Bytecode may be program code that has been compiled from source code into low-level code designed for a software interpreter. After receiving the bytecode, the user-end application may generate a blockchain transaction A including the bytecode and submit the blockchain transaction to one or more of the blockchain nodes. For example, the blockchain transaction may comprise information such as nonce (e.g., blockchain transaction serial number), from (e.g., an address of user A's account), to (e.g., empty if deploying a blockchain contract), GasLimit (e.g., an upper limit of blockchain transaction fee consumed for the blockchain transaction), GasPrice (e.g., a blockchain transaction fee offered by the sender), value (e.g., a financial transaction amount), data (e.g., the bytecode), etc. Node A may sign the blockchain transaction with various encryption methods to represent endorsement by Node A.

Node A may send the blockchain transaction to a blockchain node (e.g., Node 1) through a remote procedure call (RPC) interface 213. RPC is a protocol that a first program (e.g., user-end application) can use to request a service from a second program located in another computer on a network (e.g., blockchain node) without having to understand the network's details. When the first program causes a procedure to execute in a different address space (e.g., on Node 1), it works like a normal (local) procedure call, without the programmer explicitly coding the details for the remote interaction.

Although the compiler is shown to be included in the client device Node A, in some embodiments, the compiler can be alternatively included in another device accessible to the client device. The client device may couple to the compiler remotely to compile the source code into bytecode. In some other embodiments, the compiler can be alternatively included in the blockchain node (e.g., Node 1) or in another device accessible to the blockchain node. The blockchain node may obtain the source code from the client device and compile the source code into bytecode using the compiler. In yet other embodiments, the client device (e.g., Node A whether or not including the compiler) may be integrated with the blockchain node (e.g., Node 1). The steps performed by the client device may then be performed by the blockchain node.

On receiving the blockchain transaction, as described earlier, Node 1 may verify whether the blockchain transaction is valid. For example, the signature of Node A and other formats may be verified. If the verification succeeds, Node 1 may broadcast the blockchain transaction to the blockchain network including various other blockchain nodes. Some blockchain nodes may participate in the mining process of the blockchain transactions. The blockchain transaction sent by Node A may be picked by a certain node for consensus verification to pack into a new block. The certain node may create a contract account for the blockchain contract in association with a contract account address. The certain node may trigger its local VM to execute the blockchain contract, thereby deploying the blockchain contract to its local copy of the blockchain and updating the account states in the blockchain. If the certain node succeeds in mining the new block, the certain node may broadcast the new block to other blockchain nodes. The other blockchain nodes may verify the new block as mined by the certain blockchain node. If consensus is reached, the blockchain transaction is respectively packed to the local copies of the blockchain maintained by the blockchain nodes. The blockchain nodes may similarly trigger their local VMs (e.g., local VM 1, local VM local VM 2) to execute the blockchain contract, thus invoking the blockchain contract deployed on the local copies of the blockchain (e.g., local blockchain copy 1, local blockchain copy i, local blockchain copy 2) and making corresponding updates. The hardware machine of each blockchain node may have access to one or more virtual machines, which may be a part of or coupled to the corresponding blockchain node. Each time, a corresponding local VM may be triggered to execute the blockchain contract. Likewise, all other blockchain transactions in the new block will be executed. Lightweight nodes may also synchronize to the updated blockchain.

FIG. 2B shows invoking a deployed blockchain contract, in accordance with some embodiments. The steps are similar to the blockchain contract deployment described above with certain changes to the transmitted data. In some embodiments, a user B may program an instruction to invoke a blockchain contract in source code and input the source code to an interface of a user-end application 221. In this figure, the user-end application 221 is installed in Node B. The source code may be written in a programming language. To invoke the blockchain contract, Node B may compile the instruction using a corresponding compiler 222, which converts the source code into bytecode. After receiving the bytecode, the user-end application may generate a blockchain transaction B including the bytecode and submit the blockchain transaction to one or more of the blockchain nodes. For example, the blockchain transaction may comprise information such as nonce (e.g., blockchain transaction serial number), from (e.g., an address of user B's account), to (e.g., an address of the deployed blockchain contract), GasLimit (e.g., an upper limit of blockchain transaction fee consumed for the blockchain transaction), GasPrice (e.g., a blockchain transaction fee offered by the sender), value (e.g., a financial transaction amount), data (e.g., the bytecode), etc. Node B may sign the blockchain transaction with various encryption methods to represent endorsement by Node B. Node B may send the blockchain transaction to a blockchain node (e.g., Node 2) through a remote procedure call (RPC) interface 223.

Similar to the above description, although the compiler is shown to be included in the client device Node B, in some embodiments, the compiler can be alternatively included in another device accessible to the client device, in the blockchain node (e.g., Node 2), or in another device accessible to the blockchain node.

On receiving the blockchain transaction, Node 2 may verify if the blockchain transaction is valid. For example, the signature of Node B and other formats may be verified. If the verification succeeds, Node 2 may broadcast the blockchain transaction to the blockchain network including various other blockchain nodes. Some blockchain nodes may participate in the mining process of the blockchain transactions. The blockchain transaction sent by Node B may be picked by a certain node for consensus verification to pack into a new block. The certain node may trigger its local VM to execute the blockchain contract, thereby invoking the blockchain contract deployed on its local copy of the blockchain and updating the account states in the blockchain. If the certain node succeeds in mining the new block, the certain node may broadcast the new block to other blockchain nodes. The other blockchain nodes may verify the new block as mined by the certain blockchain node. If consensus is reached, the blockchain transaction is respectively packed to the local copies of the blockchain maintained by the blockchain nodes. The blockchain nodes may similarly trigger their local VMs (e.g., local VM 1, local VM i, local VM 2) to execute the blockchain contract, thus invoking the blockchain contract deployed on the local copies of the blockchain (e.g., local blockchain copy 1, local blockchain copy i, local blockchain copy 2) and making corresponding updates. The hardware machine of each blockchain node may have access to one or more virtual machines, which may be a part of or couple to the corresponding blockchain node. Each time, a corresponding local VM may be triggered to execute the blockchain contract. Likewise, all other blockchain transactions in the new block will be executed. Lightweight nodes may also synchronize to the updated blockchain.

Figure 3:
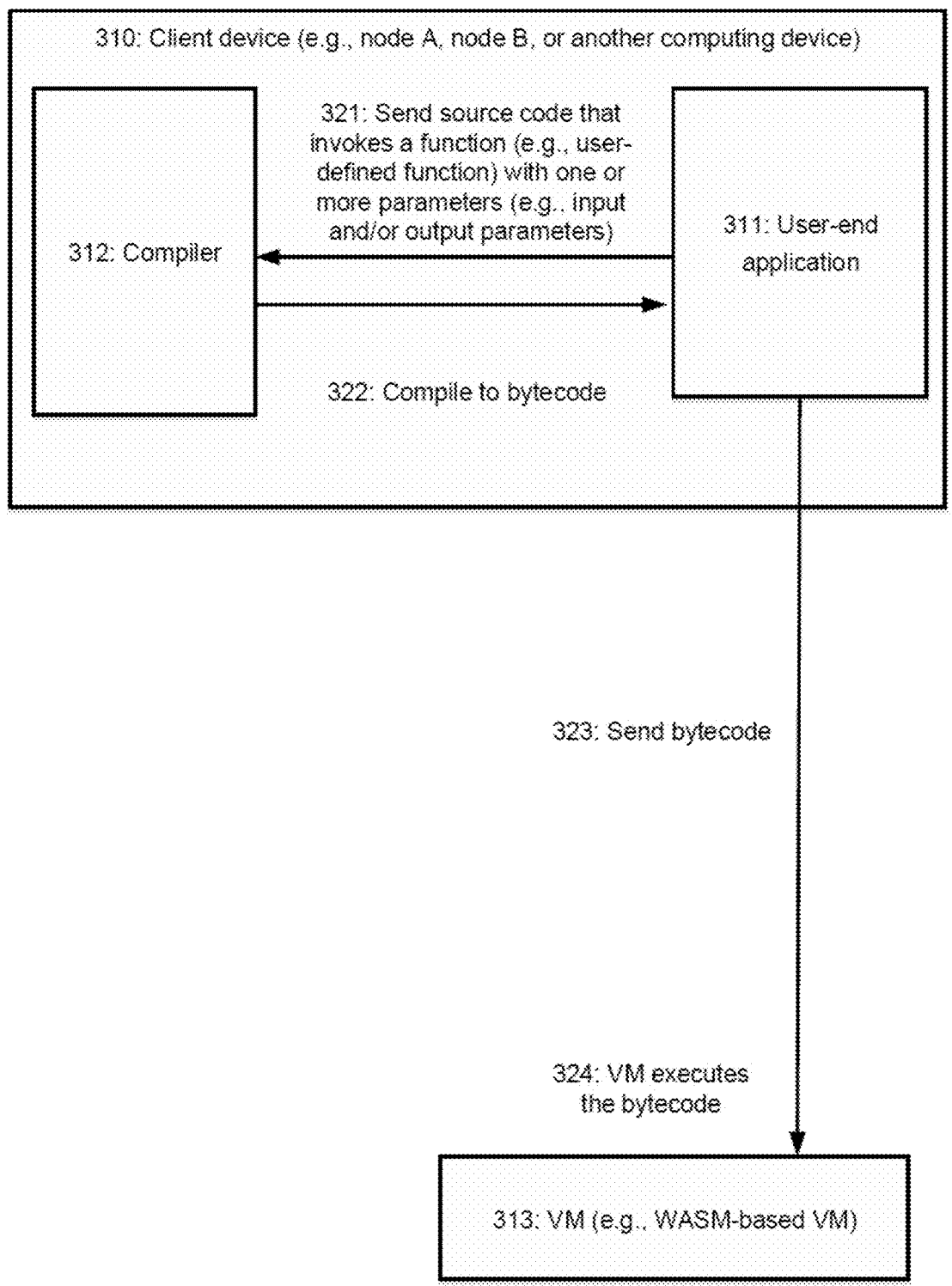
FIG. 3 illustrates a flowchart of a method for data processing, in accordance with some embodiments.
Figure 4:
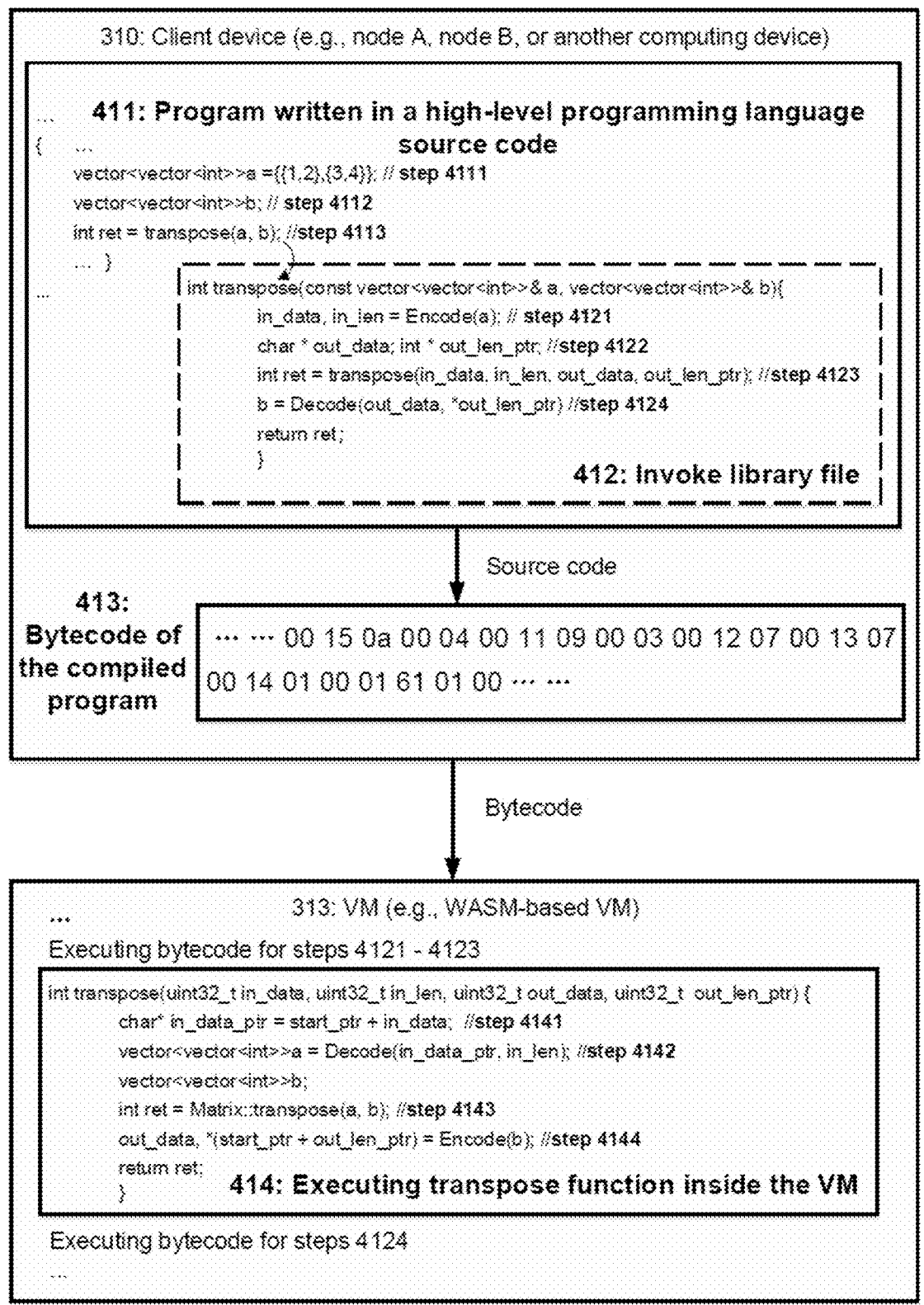
FIG. 4 illustrates the pseudocode of a method for data processing, in accordance with some embodiments.

FIG. 3 illustrates a flowchart of a method for data processing, in accordance with some embodiments. FIG. 4 illustrates pseudocodes of a method for data processing, in accordance with some embodiments. The two figures are interrelated and will be described together below. Numerals beginning with "3" refer to FIG. 3, and numerals beginning with "4" refer to FIG. 4. The operations presented below are intended to be illustrative. Depending on the implementation, the exemplary steps may include additional, fewer, or alternative steps performed in various orders or in parallel.

In some embodiments, a user may use a client device 310 to construct a program for virtual machine execution. Alternatively, the program may be machine-generated or obtained from a computing device. For example, the user may construct the program through a user-end application 311 on the client device 310. The program may be written in human-readable source code in a programming language (e.g., Java, C++, Python, Solidity, etc.). The program may invoke a function that accepts one or more input parameters and/or generates one or more output parameters. Source code 411 shows a portion of an example of the source code written in C++. The program of the source code 411 invokes a user-defined function "transpose ( )", which accepts an input parameter "a" and generates an output parameter "b". A user-defined function may be a function defined (e.g., constructed, configured, provided) by the user of a program or environment, in a context where the usual assumption is that functions are built into the program or environment. At step 4111 and step 4112, the source code declares "a" and "b" to be vector-inside-vector (e.g., two by two matrix) and assigns the value for "a", and "b" is supposed to be the result of subjecting "a" to the "transpose( )" function. The "transpose ( )" function may comprise steps not built in the virtual machine (e.g., steps in code 411 and 412) and steps built in the virtual machine (e.g., steps in code 414). To distinguish, the "transpose (a, b)" function in the code 411 and code 412 is referred to as a "program function", and the "transpose (uint32_t in_data, uint32_t in_len, uint32_t out_data, uint32_t out_len_ptr)" function built in the virtual machine is referred to as a "VM function".

For the user-end application 311, a library file (e.g., code 412) corresponding to the program function may have been created and added in advance. By step 4113, the library file may be invoked and included in the source code of the program. As shown in code 412, the library file may declare that the program function accepts the addresses of "a" and "b" instead of their values: "int transpose(const vector<vector<int>>&, vector<vector<int>>&)". For the user-defined VM function, directly accepting the addresses "vector<vector<int>>&" and "vector<vector<int>>&" may cause erroneous passing of parameters into and/or out from the VM function. Thus, a step 4121 for encoding the input parameter "a" is included, so that the VM function as executed in the virtual machine will receive an encoded "a" and return an encoded "b". Correspondingly, a step 4124 for decoding the address for output parameter "b" is included for decoding the encoded "b".

As shown in code 412, the input parameter "a" is encoded into a pointer "in_data" and a data length "in_len" at step 4121. That is, the data (e.g., nested addresses or other complicated data) stored in "a" is converted into a data stream saved to a memory location of a memory segment. The memory location may be represented by the pointer "in_data" and the data length "in_len". Alternatively, the memory location may be represented by two pointers corresponding to two ends of the memory segment. The pointer in the memory location will be shifted by compiler compilation, but will be much easier to restore in the virtual machine than without the encoding step. The simplification is more significant as "a" increases in its data structure complexity, e.g., when "a" becomes a double pointer. At step 4122, the return variables "out_data" and "out_len_ptr" are declared as another pointer and data length combination to represent the output parameter "b". At step 4123, the program function invokes the VM function built-in to the virtual machine. The VM function will accept the pointer and data length combination ("in_data" and "in_len") for the input parameter and returns another pointer and another data length combination ("out_data" and "out_len_ptr") for the output parameter. In the execution of the VM function, the virtual machine will encode the output parameter into another data stream saved to another memory segment represented by another memory location (represented by the another data length combination ("out_data" and "out_len_ptr")) and return the another memory location from the VM function to the program function. At step 4124, the encoded output parameter (represented by "out_data" and "out_len_ptr") are returned and decoded to restore the original format "vector<vector<int>>& b". In further operations, "b" may be called in its original format, if it does not interact with "transpose( )" or other similar user-defined VM functions.

At step 321, the user-end application 311 may send the source code to a compiler 312. Although the compiler 312 is shown as a part of the client device 310, the compiler 312 may be alternatively disposed outside the client device 310 and coupled to the client device 310. The compiler 312 may be triggered to compile the program at step 323.

At step 322, the program (e.g., including code 411 and code 412) may be compiled to produce a bytecode. 413 shows a portion of the bytecode as an example. The compiler may be a computer software that transforms computer code written in one programming language into another programming language. Compilers can translate source code from a high-level programming language to a lower level language (e.g., bytecode) to create an executable program. Bytecode, also termed portable code, p-code, object code, or machine code, is a form of instruction set designed for efficient execution by a software interpreter. Unlike the human-readable source code, bytecodes may include compact numeric codes, constants, and references (e.g., numeric addresses) that encode the result of compiler parsing and performing semantic analysis of program objects. The bytecode can be read and executed by a corresponding virtual machine. In some embodiments, the virtual machine (described later) is based on WASM, and thus the compiler is compatible with WASM. That is, the compilation may generate a WASM bytecode.

The bytecode may be sent to the virtual machine 313 at step 323. For example, the compiler 312 may transmit the bytecode to the user-end application 311 to send to the virtual machine 313. For another example, the compiler 312 may send the bytecode to the virtual machine 313, regardless whether the compiler 312 is inside the client device 310. Correspondingly, at step 324, the virtual machine 313 may execute the bytecode. For example, as shown in FIG. 4, the virtual machine 313 may obtain the bytecode and execute the steps 4121-4123 in the bytecode format. That is, the virtual machine 313 may encode the input parameter of the VM function to store at a memory location and obtain a pointer and a data length representing the memory location (corresponding to the step 4121), declare addresses of another pointer and another data length for representing the memory location of the encoded output parameter of the VM function (corresponding to the step 4122), invoke the VM function built in the virtual machine 313 (corresponding to the step 4123), and decode the encoded output parameter (corresponding to the step 4124).

Among other steps, corresponding to step 4123, the virtual machine 313 may invoke the VM function in the form of "i32 transpose (i32, 32, 32, 32)", where i32 is an internal data structure for WASM bytecode representing 32 bits integers. 414 shows the VM function built to and executed inside the virtual machine. The VM function itself does not need to be included in the bytecode as long as the bytecode invokes the VM function. Here, the VM function may have been programmed to accept encoded input parameter(s) and return encoded output parameter(s). As described above, the memory location of the data stream of the encoded input parameter "a" may comprise the pointer "in_data" storing an address corresponding to the memory segment, and the address may be shifted by compilation. The address stored in the pointer "in_data" may have become an address shift. At step 4141, the virtual machine may restore the shifted address according to a storage starting location "start_ptr" of the virtual machine and the address shift "in_data", obtaining the restored address as "in_data_ptr". The starting location "start_ptr" may be known to the virtual machine when the virtual machine is initiated. The starting location "start_ptr" may indicate a location in the memory allocated for various virtual machine operations. The address shift "in_data" may be compiler-dependent and may be passed by the compiler to the virtual machine (through the computing device) in the bytecode. At step 4142, the virtual machine may retrieve the encoded input parameter according to the restored address "in_data_ptr" and the data length "in_len" and decode the encoded input parameter to retrieve the input parameter. Thus, the input parameter "a" is correctly obtained by the virtual machine, and subsequent computations can be carried out. At step 4143, the virtual machine may invoke the transpose transformation in the mathematics library to transpose "a" to "b". Alternatively, other kinds of transformations or operations can be carried out. At step 4144, the virtual machine may encode the output parameter "b" and obtain a pointer "out_data" and a data length "start_ptr+out_len_ptr" representing another memory location storing the encoded output parameter. As described above, the encoded output parameter "b" may be returned to the program function upon exiting the VM function and decoded at step 4124.

FIG. 5 illustrates a flowchart of an exemplary method 510 for data processing, according to some embodiments of this specification. The method 510 may be implemented by one or more components of the blockchain network 100 of FIG. 1 (e.g., Node 1, Node 2, . . . , or Node i described above or a similar device, a combination of any of the nodes and one or more additional devices such as Node A), or a virtual machine (e.g., VM 1, VM 2, VM VM 313, etc.). The method 510 may be implemented by a system or device (e.g., computer, server) comprising various hardware machine and/or software. For example, the system or device may comprise one or more processors and one or more non-transitory computer-readable storage media (e.g., one or more memories) coupled to the one or more processors and configured with instructions executable by the one or more processors to cause the system or device (e.g., the processor) to perform the method 510. The operations of method 510 presented below are intended to be illustrative. Depending on the implementation, the method 510 may include additional, fewer, or alternative steps performed in various orders or in parallel. Further details of the method 510 can be referred to FIG. 1 to FIG. 4 and related descriptions above.

In some embodiments, a virtual machine (e.g., VM 1, VM 313) or a computing device associated with the virtual machine (e.g., Node 1 including its VM 1) may perform the method 510. Before the method 510 is performed, as described above, a program may be constructed (e.g., by a machine, by a programmer) in a high-level programming language source code for calling a function (e.g., the VM function described above, which is applicable to all functions described below with reference to FIG. 5) to perform certain operations. The function may take one or more input parameters for computation and return one or more output parameters based on one or more input parameters. To correctly pass the input parameters into the function, the program may specify a step for encoding the one or more input parameters to be provided to the function. Thus, the function can receive the one or more encoded input parameters for decoding and other operations. To correctly pass the output parameters out from the function, the function may further generate and encode the one or more output parameters for returning the encoded one or more output parameters. According, after exiting the function, the program may specify a step for decoding the one or more output parameters returned from the function.

After being correctly passed into the function, the one or more input parameters may optionally be used in the execution of the function to perform various operations. In the context of blockchain, the function may invoke a state of a blockchain. For example, the function may be called to perform a blockchain transaction based on input parameters such as account name and password and return an updated balance of the account as an output parameter.

In some embodiments, the function may be a user-defined function built in the virtual machine. Since virtual machines operate on bytecodes, the program may be compiled into a bytecode for the virtual machine to execute. A compiler (e.g., compiler 212, compiler 312) or a computing device with its compiler (e.g., Node A including its compiler 212) may compile the program into a bytecode. For example, the code 411 comprising the code 412 shown in FIG. 4 may be compiled into the bytecode. The code 412 may be a library file added to the high-level programming language for the implementation of the disclosed methods. The code 412 as shown in FIG. 4 in invoked by the code 411, and thus included in the program. The bytecode may be transmitted to the virtual machine or the computing device associated with the virtual machine for execution by the virtual machine. By compilation, the program is translated into a machine language that the virtual machine understands. The virtual machine may thus follow the bytecode to, among other steps, encode the input parameters to pass to the user-defined function, call the user-defined function to perform various operations, return encoded output parameters from the user-defined function, and decode the encoded output parameters.

In some embodiments, the compiler may compile the bytecode in a format compatible with the recipient virtual machine. In some embodiments, the virtual machine is based on a WebAssembly (WASM) format. WASM is a binary instruction format for a stack-based virtual machine. WASM may be a portable target for compilation of high-level languages like C/C++/Rust, enabling deployment on the web for client and server applications. The WASM-based virtual machine may execute a WASM bytecode compiled from the compiler. For example, the WASM-based virtual machine may be modified from the official release of WASM written in C++. By the modification, the user-defined function (e.g., transpose ( ) in the code 414) may be created for external calling (e.g., step 4123). For example, in the WASM bytecode, the user-defined function may be triggered via a "call" command Notwithstanding, the virtual machine and compiler may be based on various other formats.

In some embodiments, the input or output parameter may involve one or more pointer type variables (e.g., pointers) that respectively store addresses of other variables (e.g., string variables, integer variables, byte variables, short variables, float variables, etc.). The compilation may cause a shift to the addresses of the other variables stored in the pointers. The addresses may be changed into shift amounts. In some embodiments, the function is a user-defined function for the execution by the virtual machine and is vulnerable to the issues caused by the shift. That is, the function is not a built-in function. As a result, the virtual machine may be unable to locate the correct storage location of the input parameters for retrieval or may retrieve wrong input parameters. Similarly, the output parameters may be incorrectly computed and misplaced at an incorrect storage location. Further, in some embodiments, the virtual machine and the compiler have different word sizes. For example, the virtual machine is 32 bits, and the compiler is 64 bits. In some embodiments, 32-bit computing is the use of processors that have data-path widths, integer size, and memory address widths of 32 bits, while 64-bit computing is the use of processors that have data-path widths, integer size, and memory address widths of 64 bits. The different word sizes may cause changes to the addresses stored in the pointers, causing incorrect passing of the parameters into or out from the function. The method 510 may address these issues caused by the compilation and word size. The method 510 may be performed by a virtual machine.

Block 511 includes: obtaining a bytecode compiled from source code comprising one or more input parameters, the source code including an encoding function to encode the one or more input parameters, save the encoded one or more input parameters in a memory segment, and provide a memory location of the memory segment. In some embodiments, obtaining the bytecode compiled from the source code comprising the one or more input parameters comprises: obtaining, from a computing device, the bytecode compiled by a compiler associated with the computing device from the source code comprising the one or more input parameters. To associate with the computing device, the compiler may be disposed inside the computing device or be disposed outside and coupled to the computing device. In one example, the computing device comprises a client device for instructing the compilation of the source code and transmitting the bytecode for the virtual machine to perform operations involving a blockchain.

The input parameters may involve a complicated data structure. In some embodiments, the one or more input parameters may be represented by a data structure comprising a pointer type variable. In some embodiments, at least one of the one or more input parameters comprises a pointer type variable. For example, the function may require one or more pointer type variables, such as pointers, pointer array, etc. In some embodiments, the pointer type variable comprises a multiple indirection type variable. That is, the one or more input parameters may be represented by a data structure comprising a multiple indirection type variable. For example, the function may require a double pointer (pointer to pointer) type variable, a triple pointer type variable, a nested pointer variable, etc.

In some embodiments, a pointer (e.g., a variable) is a programming language object that stores the memory address of another value (e.g., another variable) located in the memory. Thus, the pointer contains the address of the another variable by referencing a location in the memory. For example, in the C programming languages, a pointer can be declared by placing an asterisk in front of the name of the another variable. For multiple indirection such as a double pointer, the first pointer contains the address of the second pointer, which points to the location that contains the actual value of the another variable. The double pointer can be declared by placing two asterisks in front of the name of the another variable (e.g., int **a). That is, when a target value is indirectly pointed to by the double pointer, accessing that value requires that the asterisk operator be applied twice.

The memory location may have various representations. In some embodiments, the memory location of the memory segment comprises a pointer corresponding to a starting or ending address of the memory segment (e.g., 0x00000000) and a data length corresponding to the memory segment (e.g., 4 byte). The data length may correspond to the data stored in the memory segment that starts from the starting address or ends at the ending address. In some embodiments, the memory location of the memory segment comprises a first pointer corresponding to a starting address of the memory segment (e.g., 0x00000000) and a second pointer corresponding to an ending address of the memory segment (e.g., 0x00000003). Thus, in the encoding step, the virtual machine may encode the input parameters, individually or collectively, into a data stream (e.g., a continuous data stream) represented by the pointer and the data length or by the first and second pointers. The data stream comprising the input parameters is stored on the virtual machine's memory. Thus, regardless how complicated the data structure of the input parameters is, the input parameters may be easily referenced to via the memory location for retrieval and storage. Similarly, the encoding step can be applied to the output parameters in steps described below.

In some embodiments, a portion or all of the input and/or output parameters are encoded. That is, an input or output parameter that has a simple data structure may not need to be encoded. For example, in C++, POD (plain old data) type data may be optionally not encoded. A POD is a type (including classes) where the C++ compiler guarantees that there will be no "magic" going on in the structure: for example hidden pointers to v-tables, offsets applied to the address when it is cast to other types (at least if the target's POD too), constructors, or destructors. A type is a POD when the only things in it are built-in types and combinations of them. Thus, among all parameters of the function, some or all of the input and/or output parameters may be encoded.

Block 512 includes: executing, according to the bytecode, the encoding function to encode the one or more input parameters to obtain the memory location of the memory segment storing the encoded one or more input parameters. In some embodiments, the virtual machine may follow the bytecode to encode the one or more input parameters to obtain the memory location.

Block 513 includes: providing the memory location to a function for retrieving and decoding the encoded one or more input parameters to obtain the one or more input parameters. In some embodiments, for the memory location provided to the function (e.g., step 4123 described above), the memory location comprises a pointer storing an address corresponding to the memory segment, and the address is shifted by compilation in the bytecode compiled from the source code. For example, if the memory location comprises a pointer corresponding to a starting or ending address of the memory segment and a data length corresponding to the memory segment, the address stored in the pointer may be shifted and become an address shift. For another example, if the memory location comprises a first pointer corresponding to a starting address of the memory segment and a second pointer corresponding to an ending address of the memory segment, the addresses stored in the first and second pointers may be shifted and become address shifts. With the encoding process, the shifts are easy to restore as described below.

In some embodiments, the method 510 may further comprise executing the function (e.g., code 414 described above) and exiting the function. Executing the function may comprise: restoring the shifted address according to a storage starting location of the virtual machine and an address shift obtained by the virtual machine (e.g., step 4141 described above); retrieving the encoded one or more input parameters according to the restored address (e.g., step 4142 described above); decoding the encoded one or more input parameters to retrieve the one or more input parameters (e.g., step 4142 described above); invoking another function based on the one or more input parameters to return one or more output parameters (e.g., step 4143 described above); and encoding the one or more output parameters (e.g., step 4144 described above). In some embodiments, the storage starting location may be known to the virtual machine when the virtual machine is initiated. The starting location may indicate a location in the memory allocated for various virtual machine operations. Addresses stored in the pointer of the memory location may become address shifts due to the compilation and sent the compiler to the virtual machine in the bytecode. With the address shift and the starting location, the virtual machine may restore the shifted address and thus be able to retrieve the encoded one or more input parameters according to the restored address. For example, if the memory location comprises a pointer storing the address and a data length, the virtual machine may retrieve the encoded one or more input parameters according to the restored address and the data length. For another example, if the memory location comprises a first pointer storing a first address and a second pointer storing a second address, the virtual machine may retrieve the encoded one or more input parameters according to restored first and second addresses. Then, the virtual machine may decode the encoded one or more input parameters to retrieve the one or more input parameters for various operation. Optionally, the various operations may generate one or more output parameters to return from the function.

In some embodiments, the encoding and decoding mechanisms are matching mechanisms. There may be various encoding and decoding methods, such as Unicode encoding/decoding, Base64 encoding/decoding, Hex encoding/decoding, URL encoding/decoding, HTML encoding/decoding, etc.

In some embodiments, the method 510 may further comprise decoding the one or more output parameters outside the function. For example, similar to the input parameters, the virtual machine may encode the output parameters for passing out of the function and return for decoding and further operations outside the function. The virtual machine may encode the output parameters into another data stream saved to another memory segment represented by another memory location and return the another memory location from the function. Accordingly, the virtual machine may follow the bytecode to decode the encoded output parameters to recover the output parameters in their original format (e.g., pointer, double pointer, etc.). For example, step 4124 described above may correspond to the decoding step. Thus, the virtual machine correctly invokes the function with one or more input parameters to return one or more output parameters.

In some embodiments, invoking the another function based on the one or more input parameters to return the one or more output parameters comprises invoking the another function to return a state of a blockchain. For example, the function may be executed to obtain, return, or update a state of the blockchain, or otherwise perform an operation to the blockchain. The operation may be related to a financial transaction added or to be added to the blockchain (e.g., performing a transaction and returning a current balance of a blockchain wallet), a blockchain contract added or to be added to the blockchain (e.g., executing a deployed blockchain contract and returning an execution result), etc.

Figure 6:
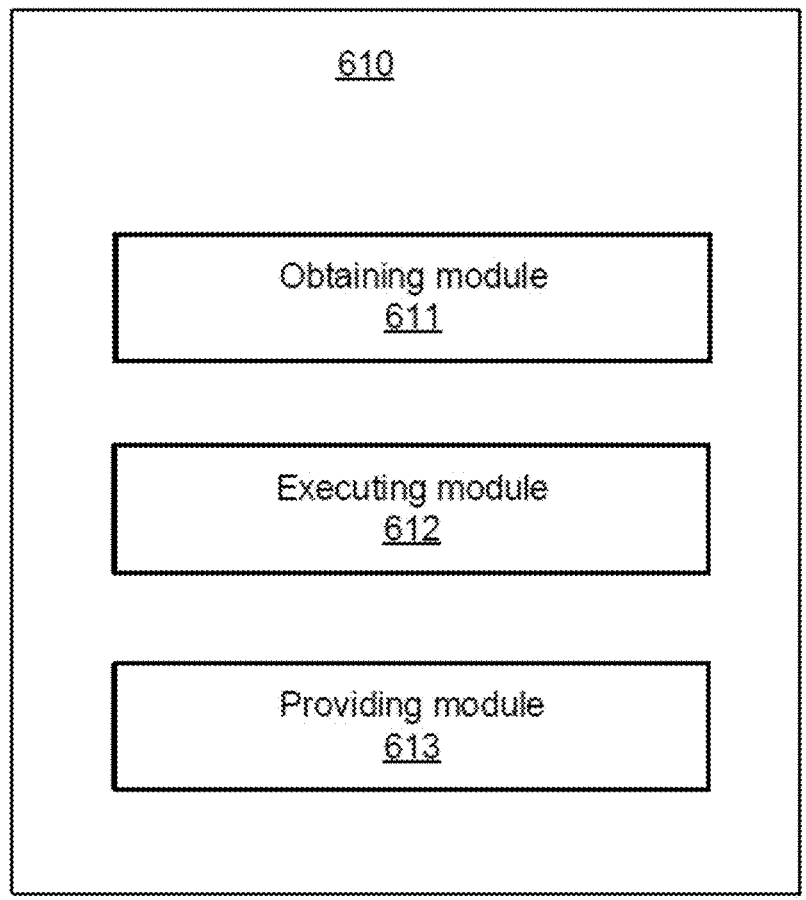
FIG. 6 illustrates a block diagram of an apparatus for data processing, in accordance with some embodiments.

FIG. 6 illustrates a block diagram of a system 610 for data processing, in accordance with some embodiments. The system 610 (e.g., a computer system) may be an example of an implementation of Node 1, Node 2, Node 3, . . . , or Node i described above or a similar device, a combination of any of the nodes and an additional device (e.g., Node A), or a virtual machine (e.g., VM 1, VM 2, VM i, VM 313, etc.). For example, the method 510 may be implemented by the system 610. The system 610 may comprise one or more processors and one or more non-transitory computer-readable storage media (e.g., one or more memories) coupled to the one or more processors and configured with instructions executable by the one or more processors to cause the system or device (e.g., the processor) to perform the methods and operations described above, e.g., the method 510. The system 610 may comprise various units/modules corresponding to the instructions (e.g., software instructions).

In some embodiments, the system 610 may be referred to as an apparatus for data processing. The apparatus may comprise an obtaining module 611 for obtaining a bytecode compiled from source code comprising one or more input parameters, the source code including an encoding function to encode the one or more input parameters, save the encoded one or more input parameters in a memory segment, and provide a memory location of the memory segment; an executing module 612 for executing, according to the bytecode, the encoding function to encode the one or more input parameters to obtain the memory location of the memory segment storing the encoded one or more input parameters; and a providing module 613 for providing the memory location to a function for retrieving and decoding the encoded one or more input parameters to obtain the one or more input parameters.

The techniques described herein are implemented by one or more special-purpose computing devices. The special-purpose computing devices may be desktop computer systems, server computer systems, portable computer systems, handheld devices, networking devices or any other device or combination of devices that incorporate hard-wired and/or program logic to implement the techniques. The special-purpose computing devices may be implemented as personal computers, laptops, cellular phones, camera phones, smart phones, personal digital assistants, media players, navigation devices, email devices, game consoles, tablet computers, wearable devices, or a combination thereof. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things. The various systems, apparatuses, storage media, modules, and units described herein may be implemented in the special-purpose computing devices, or one or more computing chips of the one or more special-purpose computing devices. In some embodiments, the instructions described herein may be implemented in a virtual machine on the special-purpose computing device. When executed, the instructions may cause the special-purpose computing device to perform various methods described herein. The virtual machine may include a software, hardware, or a combination thereof.

Figure 7:
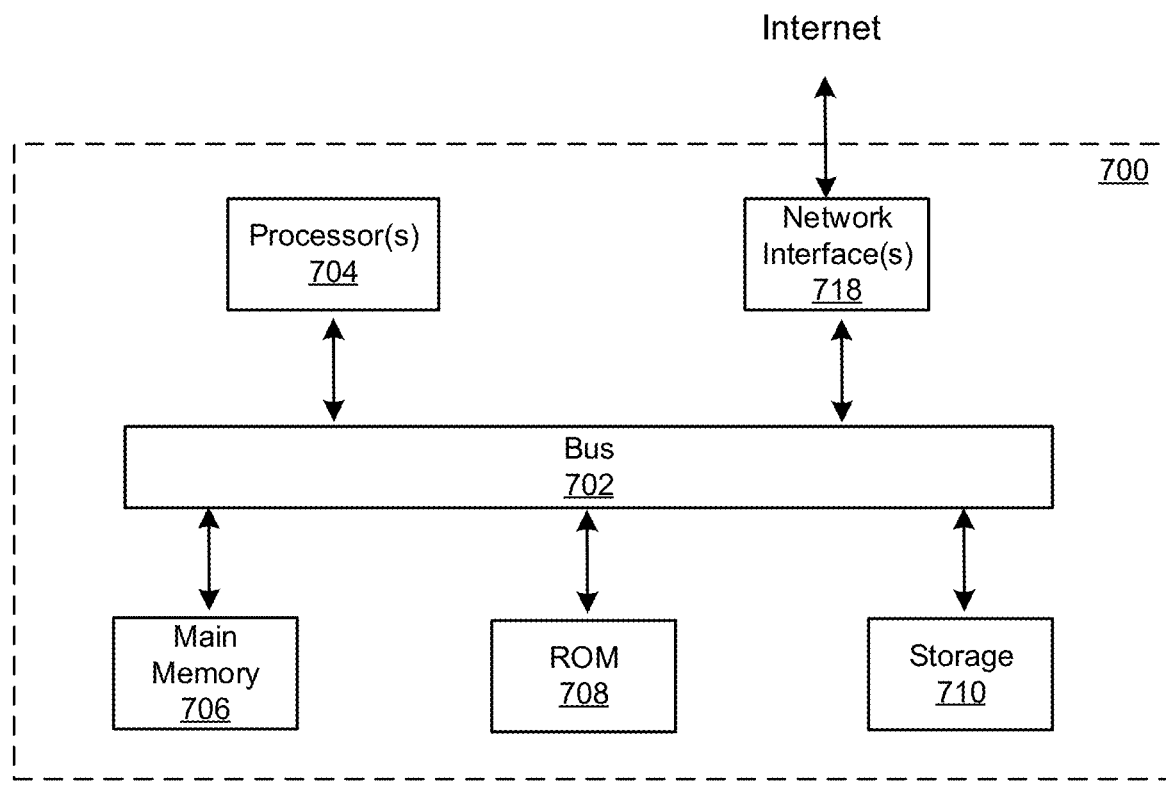
FIG. 7 illustrates a block diagram of a computer system in which any of the embodiments described herein may be implemented.

FIG. 7 is a block diagram that illustrates a computer system 700 upon which any of the embodiments described herein may be implemented. The system 700 may perform any of the methods described herein (e.g., the method 510 for data processing). The system 700 may be implemented in any of the systems described herein (e.g., the system 610 for data processing). The system 700 may be implemented in any of the nodes described herein and configured to perform corresponding steps for data processing. The computer system 700 includes a bus 702 or other communication mechanism for communicating information, one or more hardware processor(s) 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions executable by processor(s) 704. Main memory 706 also may be used for storing temporary variables or other intermediate information during execution of instructions executable by processor(s) 704. Such instructions, when stored in storage media accessible to processor(s) 704, render computer system 700 into a special-purpose machine that is customized to perform the operations specified in the instructions. The computer system 700 further includes a read only memory (ROM) 708 or other static storage device coupled to bus 702 for storing static information and instructions for processor(s) 704. A storage device 710, such as a magnetic disk, optical disk, or USB thumb drive (Flash drive), etc., is provided and coupled to bus 702 for storing information and instructions.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the operations, methods, and processes described herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The main memory 706, the ROM 708, and/or the storage device 710 may include non-transitory storage media. The term "non-transitory media," and similar terms, as used herein refers to media that store data and/or instructions that cause a machine to operate in a specific fashion, the media excludes transitory signals. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 700 also includes a network interface 718 coupled to bus 702. Network interface 718 provides a two-way data communication coupling to one or more network links that are connected to one or more local networks. For example, network interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or WAN component to communicate with a WAN). Wireless links may also be implemented. In any such implementation, network interface 718 sends and receives electrical, electromagnetic or optical signals that carry digital data streams representing various types of information.

The computer system 700 can send messages and receive data, including program code, through the network(s), network link and network interface 718. In the Internet example, a server might transmit a requested code for an application program through the Internet, the ISP, the local network and the network interface 718.

The received code may be executed by processor(s) 704 as it is received, and/or stored in storage device 710, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this specification. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The examples of blocks or states may be performed in serial, in parallel, or in some other manner Blocks or states may be added to or removed from the disclosed embodiments. The examples of systems and components described herein may be configured differently than described. For example, elements may be added to, removed from, or rearranged compared to the disclosed embodiments.

The various operations of methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some embodiments, the processors or processor-implemented engines may be located in a single geographic location (e.g., within a home environment, an office environment, or a server farm). In other embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in configurations may be implemented as a combined structure or component. Similarly, structures and functionality presented as a single component may be implemented as separate components. These and other variations, modifications, additions, and improvements fall within the scope of the subject matter herein. Furthermore, related terms (such as "first," "second," "third," etc.) used herein do not denote any order, height, or importance, but rather are used to distinguish one element from another element. Furthermore, the terms "a," "an," and "plurality" do not denote a limitation of quantity herein, but rather denote the presence of at least one of the articles mentioned.

Although an overview of the subject matter has been described with reference to specific embodiments, various modifications and changes may be made to these embodiments without departing from the broader scope of embodiments of the this specification. The Detailed Description should not to be taken in a limiting sense, and the scope of various embodiments is defined only by the appended claims, along with the full range of equivalents to which such claims are entitled.

The invention claimed is:

1. A computer-implemented method for data processing, comprising:
   obtaining, by a virtual machine, bytecode compiled from source code, wherein the source code includes one or more input parameters and an encoding function configured to encode the one or more input parameters, save the encoded one or more input parameters in a memory segment, and provide a memory location of the memory segment, and wherein the memory location comprises an address corresponding to the memory segment;
   at the virtual machine, encoding the one or more input parameters, saving the encoded one or more input parameters in the memory segment, and obtaining the memory location of the memory segment storing the encoded one or more input parameters by executing the encoding function according to the bytecode; and
   providing, by the virtual machine, the memory location to a function configured to retrieve and decode the encoded one or more input parameters to obtain the one or more input parameters.

2. The method of claim 1, wherein the address in the bytecode is shifted by the compilation from the source code.

3. The method of claim 2, further comprising:
   restoring, by the virtual machine, the shifted address according to a storage starting location of the virtual machine and an address shift obtained by the virtual machine;
   retrieving, by the virtual machine, the encoded one or more input parameters according to the restored address; and
   decoding, by the virtual machine, the encoded one or more input parameters to retrieve the one or more input parameters.

4. The method of claim 1, wherein at least one of the one or more input parameters comprises a pointer type variable.

5. The method of claim 4, wherein the pointer type variable comprises a multiple indirection type variable.

6. The method of claim 1, wherein the memory location of the memory segment comprises a pointer corresponding to a starting or ending address of the memory segment and a data length corresponding to the memory segment.

7. The method of claim 1, wherein the memory location of the memory segment comprises a first pointer corresponding to a starting address of the memory segment and a second pointer corresponding to an ending address of the memory segment.

8. The method of claim 1, wherein obtaining the bytecode compiled from the source code comprises:
   obtaining, from a computing device, the bytecode compiled by a compiler associated with the computing device from the source code.

9. The method of claim 8, wherein the virtual machine and the compiler have different word sizes.

10. The method of claim 1, wherein the virtual machine is based on a WebAssembly (WASM) format.

11. The method of claim 1, further comprising:
    invoking a different function based on the one or more input parameters to return one or more output parameters of the different function, wherein the one or more output parameters correspond to a state of a blockchain; and
    encoding the one or more output parameters.

12. A non-transitory computer-readable storage medium storing instructions executable by one or more processors, wherein execution of the instructions causes the one or more processors to perform operations comprising:
    obtaining, by a virtual machine, bytecode compiled from source code, wherein the source code includes one or more input parameters and an encoding function configured to encode the one or more input parameters, save the encoded one or more input parameters in a memory segment, and provide a memory location of the memory segment, and wherein the memory location comprises an address corresponding to the memory segment;
    at the virtual machine, encoding the one or more input parameters, saving the encoded one or more input parameters in the memory segment, and obtaining the memory location of the memory segment storing the encoded one or more input parameters by executing the encoding function according to the bytecode; and
    providing, by the virtual machine, the memory location to a function configured to retrieve and decode the encoded one or more input parameters to obtain the one or more input parameters.

13. The non-transitory computer-readable storage medium of claim 12, wherein the address in the bytecode is shifted by the compilation from the source code.

14. The non-transitory computer-readable storage medium of claim 13, wherein the operations further comprise:
    restoring, by the virtual machine, the shifted address according to a storage starting location of the virtual machine and an address shift obtained by the virtual machine;
    retrieving, by the virtual machine, the encoded one or more input parameters according to the restored address; and
    decoding, by the virtual machine, the encoded one or more input parameters to retrieve the one or more input parameters.

15. The non-transitory computer-readable storage medium of claim 12, wherein at least one of the one or more input parameters comprises a pointer type variable.

16. The non-transitory computer-readable storage medium of claim 15, wherein the pointer type variable comprises a multiple indirection type variable.

17. The non-transitory computer-readable storage medium of claim 12, wherein the memory location of the memory segment comprises a pointer corresponding to a starting or ending address of the memory segment and a data length corresponding to the memory segment.

18. The non-transitory computer-readable storage medium of claim 12, wherein the memory location of the memory segment comprises a first pointer corresponding to a starting address of the memory segment and a second pointer corresponding to an ending address of the memory segment.

19. The non-transitory computer-readable storage medium of claim 12, wherein the virtual machine is based on a WebAssembly (WASM) format.

20. A system, comprising one or more processors and one or more non-transitory computer-readable memories coupled to the one or more processors and configured with instructions executable by the one or more processors to cause the system to perform operations comprising:

obtaining, by a virtual machine, bytecode compiled from source code, wherein the source code includes one or more input parameters and an encoding function configured to encode the one or more input parameters, save the encoded one or more input parameters in a memory segment, and provide a memory location of the memory segment, and wherein the memory location comprises an address corresponding to the memory segment;

at the virtual machine, encoding the one or more input parameters, saving the encoded one or more input parameters in the memory segment, and obtaining the memory location of the memory segment storing the encoded one or more input parameters by executing the encoding function according to the bytecode; and providing, by the virtual machine, the memory location to a function configured to retrieve and decode the encoded one or more input parameters to obtain the one or more input parameters.

* * * * *